United States Patent
Song et al.

(10) Patent No.: US 7,535,525 B2
(45) Date of Patent: May 19, 2009

(54) ELECTRONIC PAPER DISPLAY DEVICE AND METHOD OF PREPARATION THE SAME

(75) Inventors: Moon-Bong Song, Seoul (KR); Soon-Hyung Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 475 days.

(21) Appl. No.: 11/276,039

(22) Filed: Feb. 10, 2006

(65) Prior Publication Data

US 2006/0181751 A1    Aug. 17, 2006

(30) Foreign Application Priority Data

Feb. 11, 2005    (KR) ..................... 10-2005-0011689

(51) Int. Cl.
*G02F 1/1335* (2006.01)
(52) U.S. Cl. ...................................... 349/106
(58) Field of Classification Search ....................... None
See application file for complete search history.

(56) References Cited

U.S. PATENT DOCUMENTS

| 2006/0007526 | A1* | 1/2006 | Cannas et al. | 359/296 |
| 2006/0146394 | A1* | 7/2006 | Kaga et al. | 359/296 |
| 2006/0210339 | A1* | 9/2006 | Shimoda et al. | 400/76 |
| 2007/0286986 | A1* | 12/2007 | Daniel et al. | 428/119 |
| 2008/0007516 | A1* | 1/2008 | Ahn et al. | 345/107 |
| 2008/0037107 | A1* | 2/2008 | Kanbe | 359/296 |

* cited by examiner

*Primary Examiner*—Sung H Pak
(74) *Attorney, Agent, or Firm*—Fish & Richardson P.C.

(57) ABSTRACT

An electronic paper display device includes a plurality of electrodes, a plurality of barrier ribs, at least one display cell defined by the electrodes and the barrier ribs. The at least one display cell includes a charged particle having a protective layer surrounding each particle, and an insulating layer positioned on at least one internal surface of the display cell. The protective layer and the insulating layer may include the same material or a different material.

15 Claims, 5 Drawing Sheets

Fig. 1
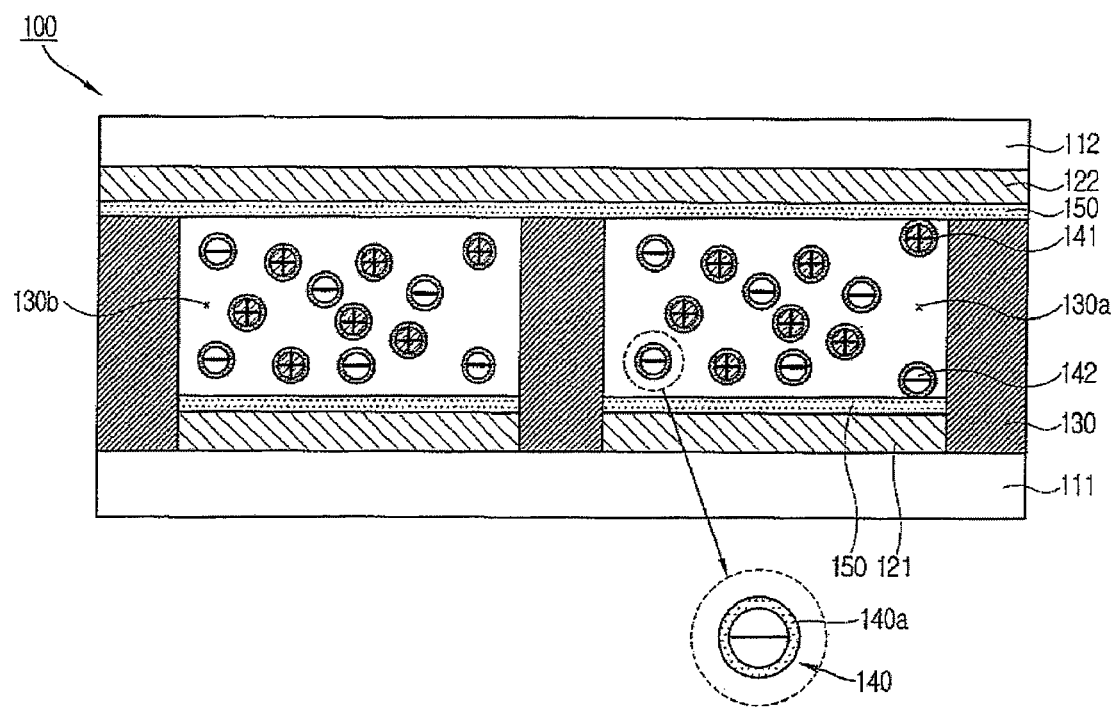
Fig. 1A
Fig. 2
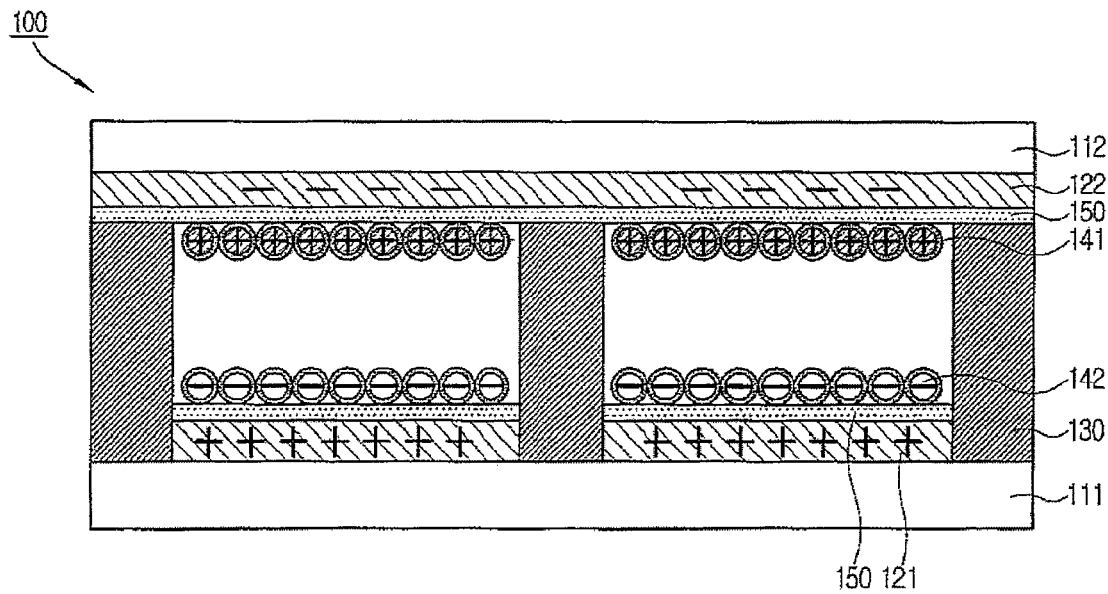

ELECTRONIC PAPER DISPLAY DEVICE AND METHOD OF PREPARATION THE SAME

CROSS-REFERENCE TO RELATED APPLICATIONS

This application claims priority under 35 U.S.C. § 119 to Korean Patent Application No. 2005-11689, filed in Korea on Feb. 11, 2005, the entirety of which is hereby incorporated by reference.

BACKGROUND

This description relates to electronic paper display devices, their operation and their method of manufacture.

Digital paper displays are being developed as next generation display devices, succeeding liquid crystal displays (LCD), plasma display panels (PDP), and electroluminescence devices. In particular, electronic or digital paper is a display device in which letters or images are displayed on a flexible substrate, such as thin plastic, in which several million beads are scattered in oil holes within the substrate. The electronic paper can be re-used several million times.

An electronic paper display device operates as a core of flexible display substrates. The electronic paper display operates in accordance with the principle of electrophoresis, e.g., where an electromagnetic field is applied to a conductive material having conductive corpuscles scattered between thin flexible substrates to impart motility to the corpuscles. The electromagnetic filed is applied to the conductive corpuscles, such as charged particles, that are scattered between thin flexible substrates and the direction in which the corpuscles are arranged is controlled by changing the polarity of the electromagnetic field to selectively display data.

In a conventional electronic paper display device that employs collision electrification, an insulating layer is typically formed between charged particles inserted inside display cells and electrodes. A driving voltage is applied to the electrodes to prevent the charged particles and the electrodes from being directly connected and to maintain the initial state, e.g., the initial charge, of the charged particles. The charged particles move toward the electrodes to which the driving voltage is applied and the position to which the charged particles move is maintained, e.g., unless an additional voltage is applied to obtain a memory effect.

The conventional insulating layer is formed of polyethylene, polystyrene, polycarbonate, polyester, polypropylene, and $SiO_2$, which differs from the material of the external surfaces of the charged particles. Due to friction, which may be caused by particle collision between the charged particles and the insulating layer, the electric charge of the particles may significantly increase so that the memory effect exceeds the particle driving voltage or the electric charge of the particles may decrease so that the memory effect is not maintained, e.g., particle collision may alter the electric charge of the particles to an amount different than the particle driving voltage. Since the conventional insulating layer is provided between the charged particles and the electrodes, when the charged particles collide with the surfaces of barrier ribs, the material of the charged particles that becomes electrified may also change.

SUMMARY

In one general aspect, an electronic paper display device includes a plurality of electrodes, a plurality of barrier ribs, and at least one display cell defined by the electrodes and the barrier ribs, wherein the at least one display cell includes a charged particle having a protective layer that surrounds the particle, and an insulating layer positioned on at least one internal surface of the display cell.

Implementations of this aspect may include one or more of the following features.

The electrodes include an upper electrode and a lower electrode forming an upper surface and a lower surface of the display cell, respectively, and the barrier ribs include barrier ribs forming side surfaces of the display cell extending between the upper surface and the lower surface of the display cell. The at least one internal surface of the display cell is one or more of the upper surface, the lower surface or a side surface of the display cell. The insulating layer is formed on each of the upper electrode, the lower electrode, and the barrier ribs. The insulating layer is formed on the upper electrode and the bottom electrode.

The insulating layer and the protective layer include the same material. The protective layer includes one or more of titanium oxide, carbon black, or silica. The insulating layer is formed by one or more of spin coating, rubbing, electrostatic coating or dipping. The insulating layer includes one or more of polyethylene, polystyrene, polycarbonate, polyester, polypropylene, titanium oxide, carbon black, or silica.

In another general aspect, an electronic paper display device includes a first electrode, a second electrode, a plurality of barrier ribs extending between the first electrode and the second electrode, at least one display cell defined by the electrodes and the barrier ribs, the at least one display cell including a top surface, a bottom surface, and a side surface, and an insulating layer positioned on at least one of the top surface and the bottom surface of the display cell.

Implementations of this aspect may include one or more of the following features.

The electronic paper display device includes a plurality of the display cells, wherein each display cell includes charged particles each having a protective layer. The insulating layer is positioned on the first electrode, the second electrode, and the barrier ribs. The insulating layer includes a material the same as a material of each protective layer. The protective layer includes one or more of titanium oxide, carbon black, or silica. The insulating layer is formed by one or more of spin coating, rubbing, electrostatic coating or dipping.

The at least one internal surface of the display cell includes a top surface, a bottom surface, and side surfaces. The protective layer and the insulating layer each include one or more of titanium oxide, carbon black, or silica. The insulating layer is formed by one or more of spin coating, rubbing, electrostatic coating, and dipping. The protective layer includes one or more of titanium oxide, carbon black, or silica. The insulating layer includes one or more of polyethylene, polystyrene, polycarbonate, polyester, polypropylene, titanium oxide, carbon black, or silica.

The electronic paper display device includes a pair of independent voltage sources, the electrodes include a lower, transparent electrode and an upper, transparent electrode formed above and separate from the lower electrode, the lower and the upper electrodes being operatively connected to the independent voltage sources. The barrier ribs extending between the lower and the upper electrodes. The insulating layer is positioned on the barrier ribs a top surface of the lower electrode, and a lower surface of the upper electrode. The electronic paper display device includes a plurality of the charged particles, wherein each of the charged particles includes the protective layer.

In another general aspect, a method of fabricating an electronic paper display device includes forming display cells that are defined by barrier ribs, an upper electrode, and a lower electrode, forming an insulating layer on the barrier ribs, the lower electrode and the upper electrode; and implanting charged particles into each of the display cells.

Implementations of this aspect may include one or more of the following features.

Forming display cells includes attaching the upper electrode to an upper surface of each of the barrier ribs. The charged particles each include a protective layer. The protective layer and the insulating layer include a common material. The protective layer and the insulating layer include a different material. The protective layer include one or more of titanium oxide, carbon black, or silica. The insulating layer includes one or more of polyethylene, polystyrene, polycarbonate, polyester, polypropylene, titanium oxide, carbon black, or silica. The insulating layer is formed by one or more of spin coating, rubbing, electrostatic coating, or dipping.

One or more of the foregoing aspects can provide an electronic paper display device, or method of fabricating an electronic display device, capable of minimizing changes in the state, such as maintaining a uniform amount of electric charge between particles, of charged particles caused by friction between moving particles. One or more of the foregoing aspects can provide an electronic paper display device, or method of fabricating an electronic display device, in which the material of the charged particles which becomes charged does not change during particle collision, e.g., between particles or with the surfaces of barrier ribs.

BRIEF DESCRIPTION OF THE DRAWINGS

FIG. 1 is a schematic view and FIG. 1A is a sectional view of the structure of an electronic paper display device according to a first implementation.

FIG. 2 is a schematic view of the principle of operation of the electronic paper display device of FIG. 1.

DETAILED DESCRIPTION

Figure 3:
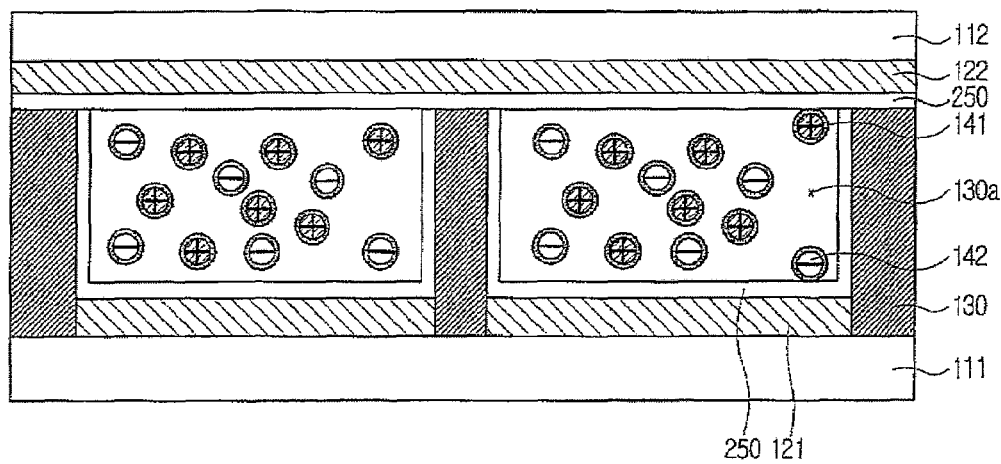
FIG. 3 is a schematic view of the structure of an electronic paper display device according to a second implementation.
Figure 4:
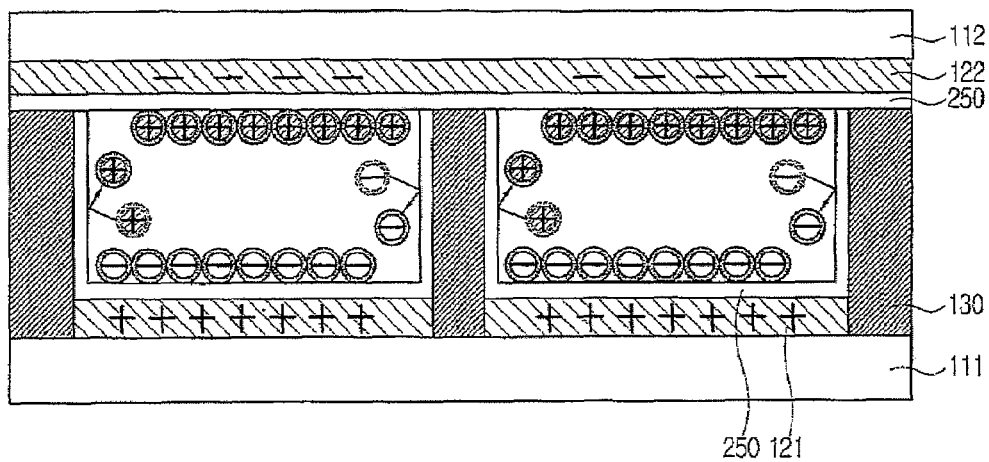
FIG. 4 is a schematic view used to illustrate the principle of operation of the electronic paper display device of FIG. 3.

An electronic paper display device, its operation, and a method of fabricating the same will be described in detail with reference to FIGS. 1 to 6E. Referring to FIG. 1, an electronic paper display device 100 according to a first embodiment includes substrates 111 and 112, such as plastic or glass, electrodes 121 and 122, such as transparent electrodes, to which a driving voltage is applied, and barrier ribs 130 for separating the space between the electrodes 121, 122 into cells, e.g., a first cell 130a from a second cell 130b. Corpuscles, e.g., charged particles 140 are provided in each of the cells partitioned off by the barrier ribs 130, and an insulating layer 150 is provided between cells 130a, 130b and each of the electrodes 121, 122 to separate the charged particles 140 from the electrodes 121 and 122.

The substrates 111, 112 form a bottom substrate 111 provided on the lowermost end of the display device 100 to support the display device 100 and a top substrate 112 provided above, and separate from, the bottom substrate 111. The substrates 111, 112 are made of material that transmits light, such as plastic or glass. The substrates 111, 112 may be transparent.

The electrodes 121, 122, include a bottom electrode 121 formed on an upper surface of the bottom substrate 111 and a top electrode 122 formed below a lower surface of the top substrate 112 and above, and separate from, the bottom electrode 121. Independent and opposite voltages are applied to each of the bottom electrode 121 and the top electrode 122, respectively, e.g., so that an electric field caused by a difference in electric potential is generated between the bottom electrode 121 and the top electrode 122. For example, a positive (+) voltage is applied to the bottom electrode 121 and a negative (−) voltage is applied to the top electrode 122, so that charged particles are driven toward electrodes having opposite polarity (such as seen in FIG. 2).

The barrier ribs 130 extend perpendicularly between the bottom electrode 121 and the top electrode 122 so that the barrier ribs 130 form a display cell 130a. For example, the display cell 130a is surrounded by the barrier ribs 130, the bottom electrode 121, and the top electrode 122. The charged particles 140 are provided within the display cells 130a and 130b, partitioned off by the barrier ribs 130 and the electrodes 121 and 122. The charged particles 140 include black charged particles 141, e.g., positively (+) charged particles, and white charged particles 142, e.g., negatively (−) charged particles. The charged particles 140 are selectively drawn to corresponding electrodes by the electric field formed in the display cells. For example, when a negative (−) voltage is applied to the top electrode 122, the positively charged (black) particles 141 are drawn to the top electrode 122 so that the image displayed through the transparent top substrate 112 appears black with respect to that cell. In contrast, when a positive (+) voltage is applied to the top electrode 122, the negatively charged (white) particles 142 are drawn to the top electrode 122 so that the image displayed through the transparent top substrate 112 appears white with respect to that cell.

The external surfaces of the charged particles 140 are provided with one or more protective layers 140a. When protective layer(s) 140a are added to the external surfaces of the charged particles 140, changes to the charge of the particles 140 otherwise experienced due to contact between adjacent particles 140 and/or structures surrounding the cell containing the charged particles are reduced or eliminated. The protective layer(s) 140a may include one or more of the following exemplary materials of titanium oxide, carbon black, and/or silica.

The insulating layer 150 is formed below, e.g., on the lower surface of, the top electrode 122 and above, e.g., on the upper surface of, the bottom electrode 121 to prevent the charged particles 140 drawn to the electrodes from directly colliding with the electrodes 121 and 122.

According to the first implementation, the insulating layer 150 is made of the same material as the protective layer(s) 140a of the charged particles 140. When the insulating layer 150 formed on the bottom surface of the top electrode 122 and the top surface of the bottom electrode 121 is formed of the same material as the protective layer(s) 140a of the charged particles 140, it is possible to prevent the charged particles 140 from becoming altered, e.g., changing charge or damaging the particles, when the charged particles 140 collide with the insulating layer 150 or each other.

The insulating layer 150 can be formed of one or more of the following exemplary materials, including polyethylene, polystyrene, polycarbonate, polyester, polypropylene, and/or silica ($SiO_2$). When the material of the insulating layer 150 is different from the protective layer(s)s 140a of the charged particles, the amount of electrification caused by friction (including collision) between the charged particles 140 and the insulating layer 150 is relatively small. Nevertheless, according to the first embodiment, by forming some or all of the insulating layer 150 with the same material as the protective layer(s)s 140a, it is possible to reduce such changes in the amount of electrification of the charged particles, particularly when at least the surface of the insulating layer 150 faces the cell is so formed. The insulating layer 150 is applied to the bottom surface of the top electrode 122 and the top surface of the bottom electrode 121 by one or more of the following processes, including spin coating, rubbing, electrostatic coating, and/or dipping.

The principle of operation of the electronic paper display device 100 according to the first embodiment will be described in greater detail hereinafter. Referring to FIG. 2, when a sufficient voltage is applied to the bottom electrode 121 and the top electrode 122 of the electronic paper display device 100, the charged particles 140 are drawn to the electrodes having opposite polarities. For example, when positively charged (black) particles 141 and negatively charged (white) particles 142 are provided in the cell(s), and a negative (−) voltage is applied to the bottom electrode 121 and a positive (+) voltage is applied to the top electrode 122, the positively charged (black) particles 141 are drawn to the bottom electrode 121 and the negatively charged (white) particles 142 are drawn to the top electrode 122 by electric force. Therefore, the image displayed through the top substrate 112 is white.

In contrast, when positively charged (black) particles 141 and negatively charged (white) particles 142 are provided in the cell(s), and a positive (+) voltage is applied to the bottom electrode 121, and a negative (−) voltage is applied to the top electrode 122, the negatively charged (white) particles 142 are drawn to the bottom electrode 121 and the positively charged (black) particles 141 are drawn to the top electrode 122. Therefore, the image displayed through the top substrate 112 is black.

Since the charged particles 140 drawn to the bottom or top electrodes 121 and 122 are physically separated by the insulating layer 150, e.g., not in direct contact with the electrodes, the amount of charge is not reduced and the final state of the particles is maintained without applying additional or extraneous voltage to the electrodes, e.g., a memory effect is obtained.

In particular, the insulating layer 150 is formed of the same material as the protective layer(s) 140a of the charged particles 140 so that it is possible to prevent the characteristics of the charged particles 140 from changing due to the charged particles 140 colliding (friction) with the insulating layer 150 or adjacent particles. However, although the insulating layer 150 is formed of the same material as the protective layer(s)s 140a of the charged particles 140, the insulating layer 150 may be formed of an insulating material containing only some of the same or similar materials as the protective layer(s) 140a.

For example, the collision of particles or rubbing of materials together can cause the buildup of electrical charges on the surfaces of the adjacent particles or materials, e.g., on the surfaces of the charged particles, the insulating layer(s) or the structure defining each of the cell(s). In addition, friction between adjacent particles or structures may also lead to physical degradation of particles and thus, possibly altering the charge of particles. Materials or surfaces having a buildup of electrical charges thereon may be prevented from experiencing the attractive forces that would typically result in the transfer of electrons through static electricity from one material or particle to another by forming the materials of the same or similar material, e.g., any extraneous surface charge that is built up results in repulsive forces between adjacent particles. For example, nonconductive materials are often susceptible to or involved in the generation of static electricity and many metals are often not susceptible to static electricity.

Hereinafter, an electronic paper display device 200 according to a second embodiment will be described in greater detail hereinafter. The elements that perform the same functions as illustrated in the first embodiment are denoted by the same reference numerals and a repeated description thereof will be omitted.

Referring to FIG. 3, an insulating layer 250 included in the electronic paper display device 200 according to the second embodiment is formed on the side surfaces of the barrier ribs 130 as well as on the bottom surface of the top electrode 122 and the top surface of the bottom electrode 121.

In this case, the material of the insulating layer 250 is not limited to the same material as the protective layer(s) 140a of the charged particles 140 and may be one or more of the following exemplary similar materials, including polyethylene, polystyrene, polycarbonate, polyester, polypropylene, titanium oxide, carbon black, and/or silica.

As described above, the internal surface of the display cell 130a partitioned off by the barrier ribs 130, the top electrode 122, and the bottom electrode 121 is insulated by the insulating layer 250 so that, although the charged particles 140 collide with the barrier ribs 130, the charged particles 140 are separated by the insulating layer 250 to prevent the charged particles 140 from directly contacting the barrier ribs 130 and to reduce or prevent changes in the state of the charged particles, e.g., altering charge or damaging the protective materials.

In the first embodiment, when the insulating layer 150 is formed only on the bottom surface of the top electrode 122 and the top surface of the bottom electrode 121, the driving voltage is applied to the electrodes so that the charged particles 140 drawn to the electrodes may collide with the barrier ribs. However, in the second embodiment, when the insulating layer 250 is formed on the side surfaces of the barrier ribs 130, it is possible to reduce or prevent changes to the electrification characteristics of the charged particles 140 despite the charged particles 140 colliding with the barrier ribs 130.

An electronic display device 300 according to a third embodiment will be described in greater detail hereinafter. The elements that perform the same functions as illustrated in the first embodiment of the present are denoted by the same reference numerals and a repeated description thereof will be omitted.

Figure 5:
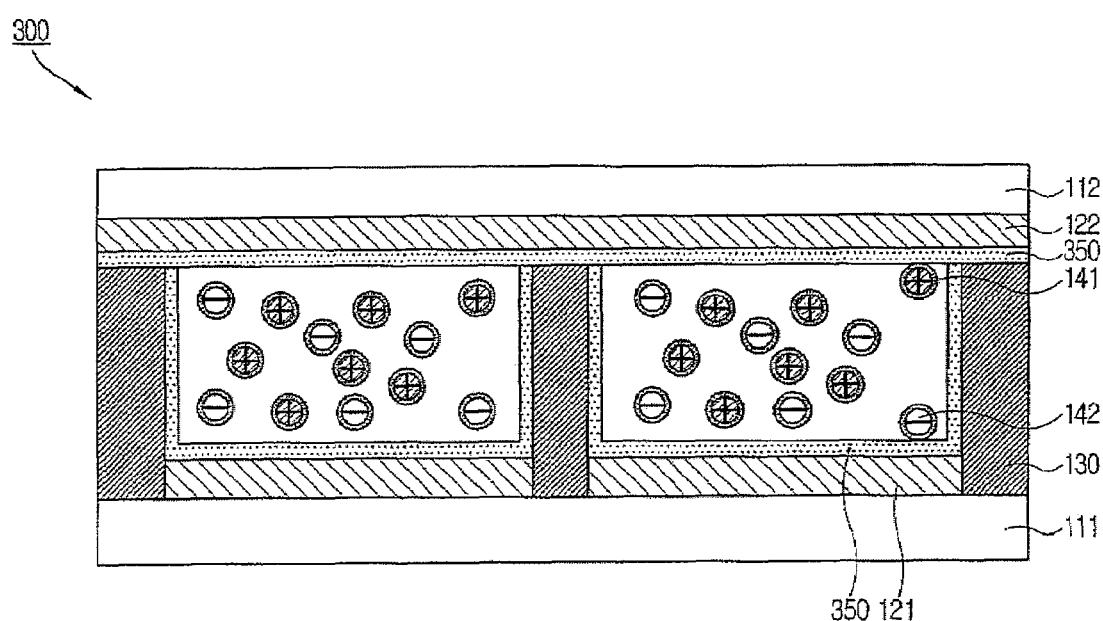
FIG. 5 is a schematic view of the structure of an electronic paper display device according to a third implementation.

Referring to FIG. 5, an insulating layer 350 included in the electronic display device 300 according to the third embodiment is formed of the same material as the protective layer(s) 140a of the charged particles 140 and is formed on the bottom surface of the top electrode 122, the top surface of the bottom electrode 121, and the side surfaces of the barrier ribs 130.

For example, the insulating layer 350 is formed on the side surfaces of the barrier ribs 130 as well as the electrodes 121 and 122 so that it is possible to prevent the electrification characteristics of the electrification particles 140 from changing when the charged particles 140 collide with the barrier ribs 130. At the same time, the insulating layer 350 is formed of the same material as the protective layer(s) 140a of the charged particles 140 so that it is possible to reduce or minimize any changes in the amount of electrification when the charged particles 140 collide with the insulating layer 350.

The principle of operation of the electronic paper display device 300 according to the third embodiment will be described in greater detail hereinafter. When a sufficient voltage is applied to the bottom electrode 121 and the top electrode 122 of the electronic paper display device 300, the charged particles 141 and 142 move toward the electrodes having opposite polarities, e.g., to electrodes to which an opposite voltage is applied. For example, when positively (+) charged (black) particles 141 and negatively (−) charged (white) particles 142 are provided in the cell(s), and a negative (−) voltage is applied to the bottom electrode 121 and a positive (+) voltage is applied to the top electrode 122, the black charged particles 141 are drawn to the bottom electrode 121 and the white charged particles 142 are drawn to the top electrode 122 by electric force. Therefore, the image displayed through the top substrate 112 is white.

In contrast, when positively (+) charged (black) particles 141 and negatively (−) charged (white) particles 142 are provided in the cell(s), and a positive (+) voltage is applied to the bottom electrode 121 and a negative (−) voltage is applied to the top electrode 122, the white charged particles 142 are drawn to the bottom electrode 121 and the black charged particles 141 are drawn to the top electrode 122. Therefore, the image displayed through the top substrate 112 is black.

As described above, since the charged particles 140 drawn to the bottom or top electrodes 121 and 122 are separated by the insulating layer 350 to prevent the charged particles from being in direct contact with the electrodes 121 and 122, changes otherwise experienced with respect to the amount of electrification charges are reduced or eliminated and the final electrification state is more stably maintained, e.g., extraneous voltage is not applied to the electrodes. That is, a memory effect is obtained without having to compensate for electrostatic charging of the charged particles moving within the cells.

As described above, since the insulating layer 350 is formed on the side surfaces of the barrier ribs 130, as well as the electrodes 121 and 122, it is possible to reduce or prevent changes to the electrification characteristics of the charged particles 140 that otherwise may be experienced as a result of the charged particles 140 colliding with the barrier ribs 130. The insulating layer 350 is formed of the same material as the protective layer(s) 140a of the charged particles 140, so it is possible to prevent the electrification characteristics of the charged particles 140 from changing despite the charged particles 140 colliding with the insulating layer 350.

Figure 6A:
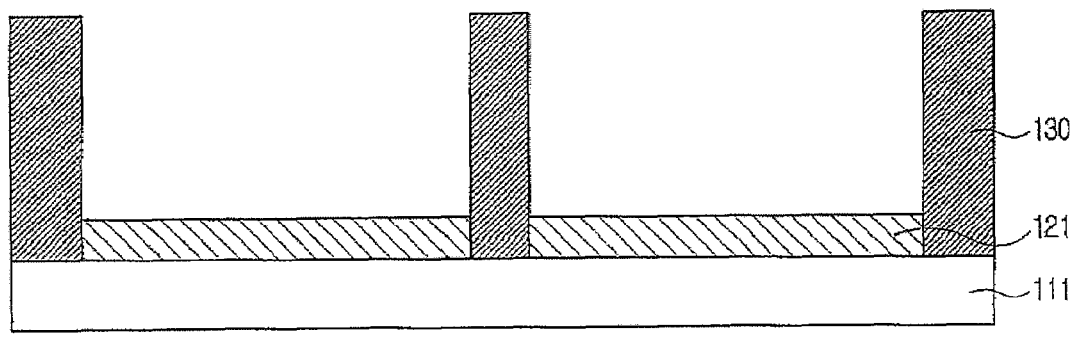
FIGS. 6A to 6E show a process of fabricating an electronic paper display device according to a fourth implementation.

One example of a method of fabricating the electronic paper display device illustrated by FIG. 5 will be described in greater detail hereinafter. Referring to FIG. 6A, the transparent bottom substrate 111 formed of glass or plastic is coated with transparent electrodes, e.g., electrodes formed of indium tin oxide (ITO) or conductive polymer, to form the bottom electrode 121 and the barrier ribs 130 are attached perpendicularly to the top surface of the bottom substrate 111.

Figure 6B:
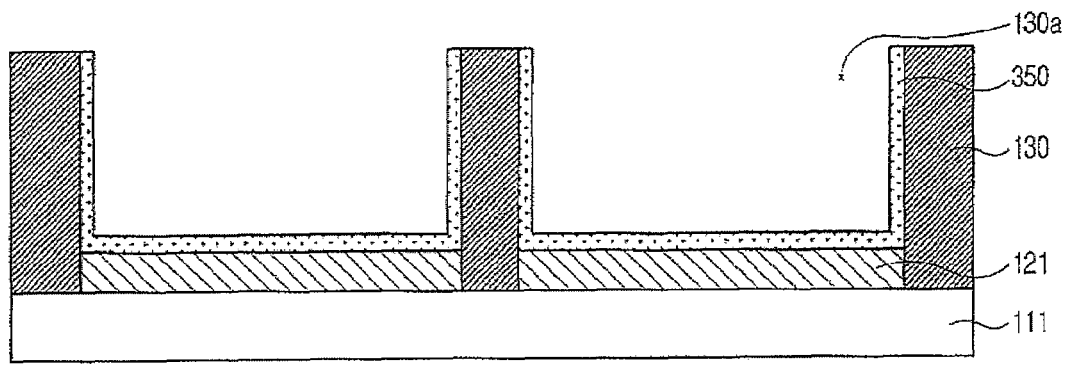

Referring to FIG. 6B, the display cell 130a is partitioned by the barrier ribs 130 which are coated with an insulating layer 350. At this time, the insulating layer 350 is formed of the same material as the protective layer(s)s 140a (FIG. 1A) added to the external surfaces of the charged particles 140 and is applied by one or more of the following exemplary processes, including spin coating, rubbing, electrostatic coating, and/or dipping.

Figure 6C:
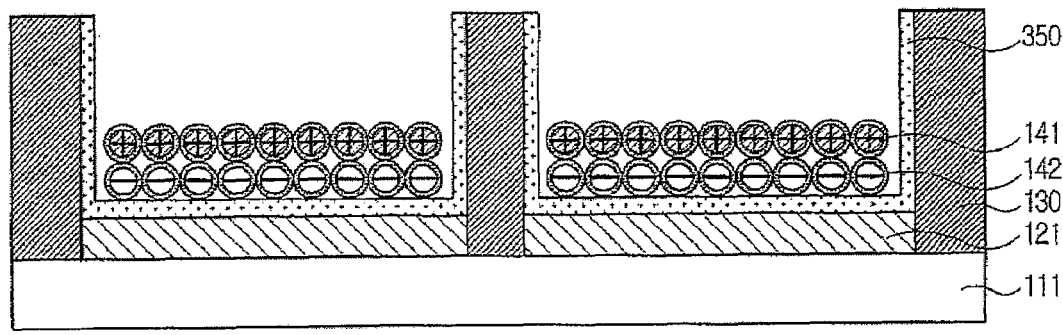

Referring to FIG. 6C, the white charged particles 142 and the black charged particles 141 are inserted into the display cell 130a formed by the barrier ribs 130 and the bottom electrode 121. The charged particles 141 and 142 may be implanted into the display cell 130a by one or more of the following exemplary processes, including corona discharge, electrification and/or laser printing.

Figure 6D:
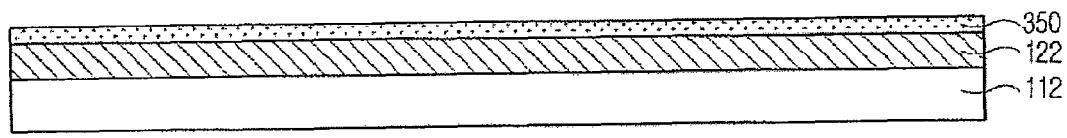

Referring to FIG. 6D, the top substrate 112 is coated with the transparent electrodes, e.g., formed of ITO or conductive polymer, to form the top electrode 122 and the top electrode 122 is coated with the insulating layer 350 by one or more of the following exemplary processes, including spin coating, rubbing, electrostatic coating, and/or dipping.

Figure 6E:
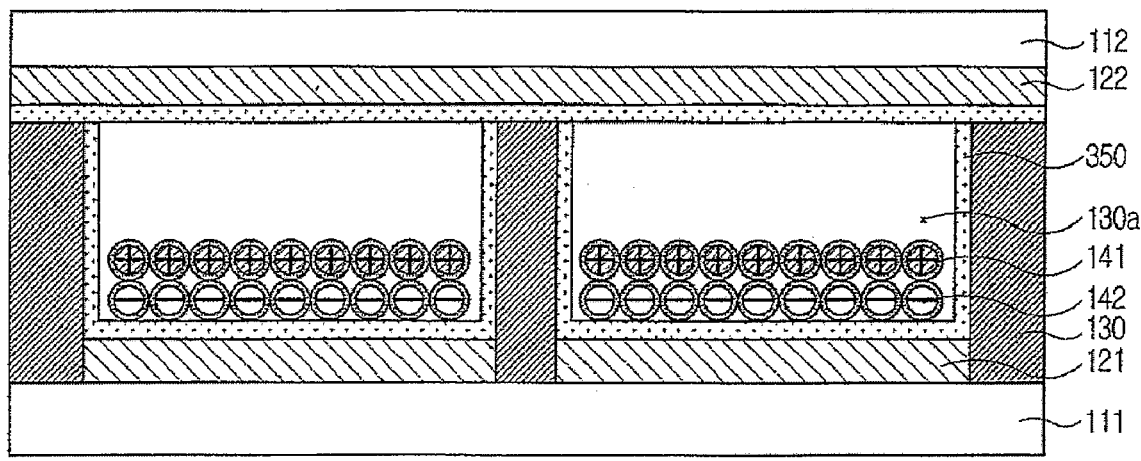

Referring to FIG. 6E, the electronic paper display process is fully fabricated when the top electrode 122 is attached to the top of the barrier ribs 130, so that the insulating layer 350 of the top electrode 122 is positioned on top of the display cell 130a. Since the insulating layer 350 is formed on the internal surface of the display cell 130a, e.g., the bottom surface of the top electrode 122, the top surface of the bottom electrode 121, and the side surfaces of the barrier ribs 130, it is possible to prevent the electrification characteristics from changing when the charged particles 141 and 142 collide with the barrier ribs 130 (or each other).

Also, the insulating layer 350 is formed of the same or similar material as the protective layer(s)s 140a of the charged particles 140, so that it is possible to significantly reduce any change in the amount of electrification when the charged particles 140 collide with the insulating layer 350.

By forming the insulating layer(s), protective layer(s) or other structures defining cell(s) of any of the implementations described above of the same or similar material, changes in the amount of the electrification of the charged particles and/or the physical condition of the charged particles may be prevented and/or reduced. With respect to the implementations shown in FIG. 1 and/or FIG. 3, a similar process as shown in FIGS. 6A to 6E may be utilized. However, the application of the insulating layer 150 will be only in those locations of the cell and device requiring the insulating layer 150, e.g., along a single surface of each cell, two or more surfaces, etc.

It should be understood that the above-described implementations are not limited by any of the details of the foregoing description. Accordingly, other implementations are within the scope of the following claims.

What is claimed is:

1. An electronic paper display device comprising:
    a plurality of electrodes;
    a plurality of barrier ribs; and
    at least one display cell defined by the electrodes and the barrier ribs, wherein the at least one display cell comprises a charged particle having a protective layer that surrounds the particle, and an insulating layer positioned on an internal surface of the display cell and the plurality of electrodes,
    wherein the insulating layer comprises a material the same as a material of the protective layer.

2. The electronic paper display device of claim 1, wherein the electrodes include an upper electrode and a lower electrode forming an upper surface and a lower surface of the display cell, respectively, and the barrier ribs include barrier ribs forming side surfaces of the display cell extending between the upper surface and the lower surface of the display cell.

3. The electronic display device of claim 2, wherein the at least one internal surface of the display cell is one or more of the upper surface, the lower surface or a side surface of the display cell.

4. The electronic paper display device of claim 2, wherein the insulating layer is positioned on each of the upper electrode, the lower electrode, and the barrier ribs.

5. The electronic paper display device of claim 2, wherein the insulating layer is positioned on the upper electrode and the bottom electrode.

6. The electronic paper display device of claim 1, wherein the protective layer includes one or more of titanium oxide, carbon black, or silica.

7. The electronic paper display device of claim 1, wherein the insulating layer is formed by one or more of spin coating, rubbing, electrostatic coating or dipping.

8. The electronic paper display device of claim 1, wherein the insulating layer comprises one or more of polyethylene, polystyrene, polycarbonate, polyester, polypropylene, titanium oxide, carbon black, or silica.

9. An electronic paper display device comprising;
a electrodes comprised a lower, transparent electrode and an upper, transparent electrode provided above and separate from the lower electrode, the lower and the upper electrodes being operatively connected to the independent voltage sources;
a barrier ribs extended between the lower and the upper electrodes;
insulating layers positioned on each of the barrier ribs, the top surface of the lower electrode, and the lower surface of the upper electrode; and
a plurality of the charged particles, wherein each of the charged particles includes the protective layer,
wherein the insulating layer comprises a material the same as a material of the protective layer.

10. The electronic paper display device of claim 9, wherein the protective layer comprises one or more of titanium oxide, carbon black, or silica.

11. The electronic paper display device of claim 9, wherein the insulating layer comprises one or more of titanium oxide, carbon black, or silica.

12. A method of fabricating an electronic paper display device, the method more including:
forming an insulating layer on the side surfaces of the barrier ribs and the top surface of the bottom electrode;
forming an insulating layer on the bottom surface of a top electrode;
implanting charged particles into each of display cells defined by the electrodes and the barrier ribs, wherein the charged particles each includes a protective layer; and
attaching the top electrode to the top of the barrier ribs,
wherein the insulating layer comprises a material the same as a material of the protective layer.

13. The method of claim 12, wherein the protective layer comprises one or more of titanium oxide, carbon black, or silica.

14. The method of claim 12, wherein the insulating layer comprises one or more of polyethylene, polystyrene, polycarbonate, polyester, polypropylene, titanium oxide, carbon black, or silica.

15. The method of claim 12, wherein the insulating layer is formed by one or more of spin coating, rubbing, electrostatic coating, or dipping.

* * * * *